United States Patent [19]

Watanabe et al.

[11] Patent Number: 4,984,000
[45] Date of Patent: Jan. 8, 1991

[54] LENS DRIVING APPARATUS FOR A CAMERA

[75] Inventors: Youji Watanabe, Sagamihara; Yoshiaki Kobayashi, Nagano; Kazuhiro Satoh, Tokyo, all of Japan

[73] Assignee: Olympus Optical Co., Ltd., Tokyo, Japan

[21] Appl. No.: 431,747

[22] Filed: Nov. 3, 1989

[30] Foreign Application Priority Data

Nov. 11, 1988 [JP] Japan .................. 63-285518

[51] Int. Cl.⁵ .............................................. G03B 3/10
[52] U.S. Cl. ................................................ 354/195.1
[58] Field of Search ..................................... 354/195.1

[56] References Cited

U.S. PATENT DOCUMENTS 4,743,931  5/1988  Matsuzaki et al. ................ 354/400

FOREIGN PATENT DOCUMENTS 51-13236  2/1976  Japan .
63-89823  4/1983  Japan .
63-89824  4/1988  Japan .
63-89825  4/1988  Japan .
63-89826  4/1988  Japan .

Primary Examiner—Michael L. Gellner
Attorney, Agent, or Firm—Frishauf, Holtz, Goodman & Woodward

[57] ABSTRACT

A lens driving apparatus for use in a camera, which adjusts the focus or the angle of view of a lens by means of a motor driven in accordance with the amount of rotation and the rotational angle of rotational operation member provided on a lens body or a camera body, comprises a first detector for detecting the operational direction and the amount of operation of the rotational operation member and generates an operational direction signal and an amount-of-operation pulse signal, a second detector for detecting the actual amount of driving of the lens and generating a drive pulse signal, a motor driver for rotating the motor in a direction according to the operational direction signal until the difference between the count value of an amount-of-operation pulse and an amount-of-driving pulse becomes 0, and a CPU for detecting pressing of the lens against a drivable end portion, inhibiting driving of the lens in that direction, and changing the resistive force of the operation member when operated, thus alarming that the lens has reached the end, in a case where a generation interval of the drive pulse signal is greater than a predetermined time even if the motor is driven.

22 Claims, 19 Drawing Sheets

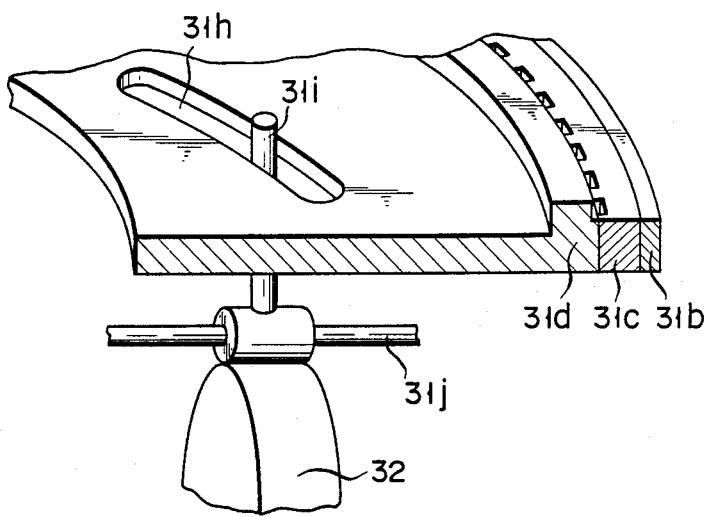
F I G. 4B

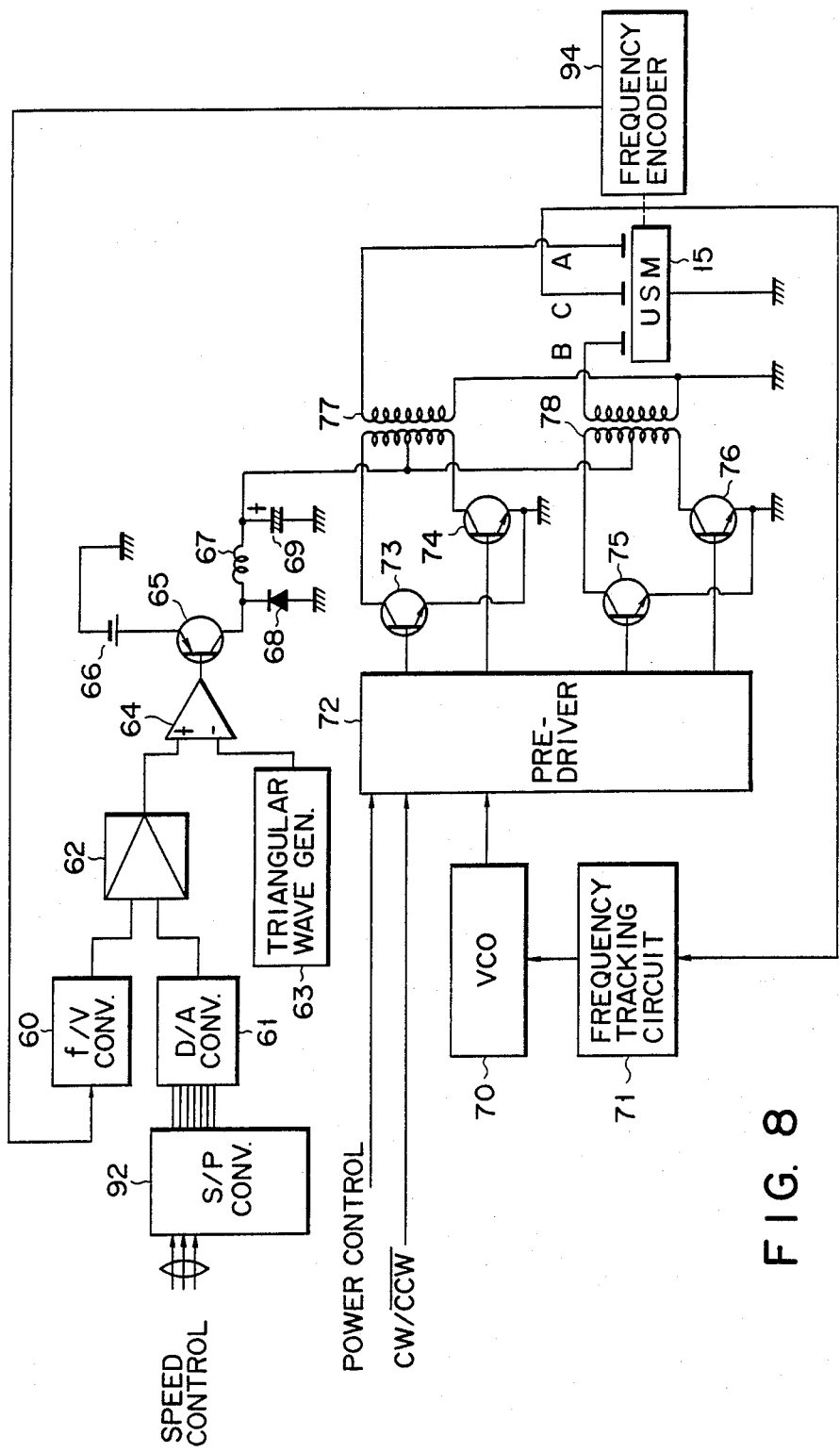
F I G. 8

| FLAG | | | | | DISPLAY | JUMP DESIGNATION |
|---|---|---|---|---|---|---|
| PFINT-F | MPINT-F | CLS-F | INF-F | DIR-F | | |
| 0 | 0 | — | — | — | OFF | 2ms? (STEP #106) |
| 0 | 1 | — | — | — | OFF | MOTOR DRIVE (STEP #128) |
| 1 | — | 0 | 0 | — | OFF | MOTOR DRIVE (STEP #128) |
| 1 | — | 1 | 0 | 0 | CLOSEST | 2ms? (STEP #106) |
| 1 | — | 1 | 0 | 1 | OFF | MOTOR DRIVE (STEP #128) |
| 1 | — | 0 | 1 | 0 | OFF | MOTOR DRIVE (STEP #128) |
| 1 | — | 0 | 1 | 1 | INFINITY | 2ms? (STEP #106) |

F I G. 14

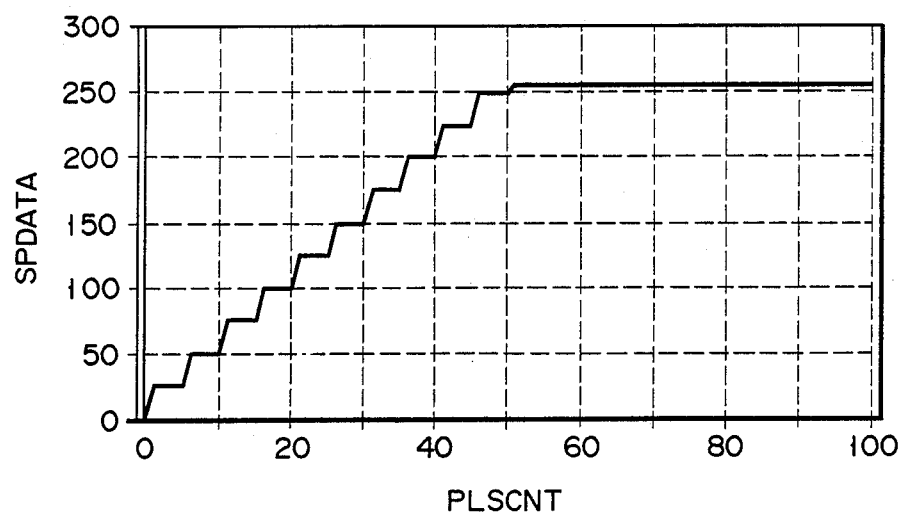
F I G. 15

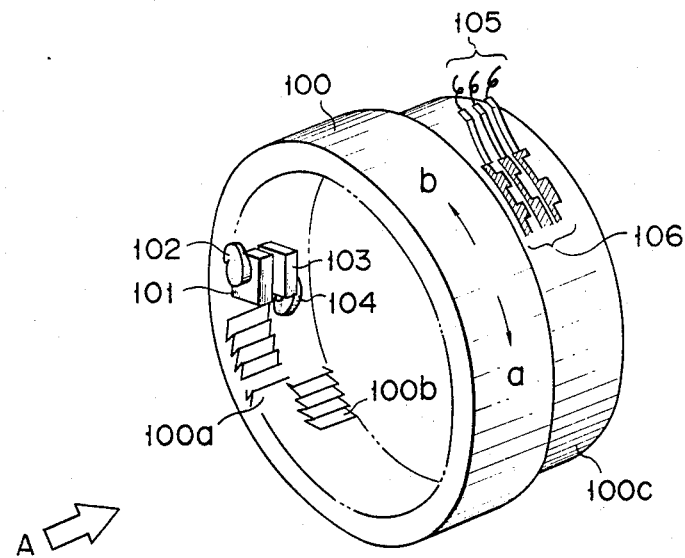
F I G. 19
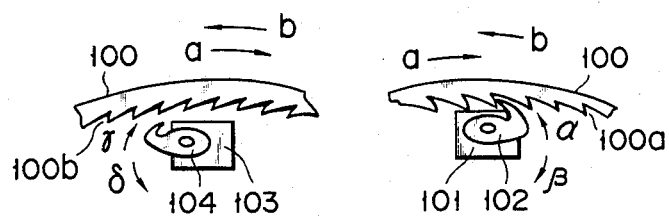
F I G. 21   F I G. 20

LENS DRIVING APPARATUS FOR A CAMERA

BACKGROUND OF THE INVENTION

1. Field of the Invention

The present invention relates to a lens driving apparatus for electrically driving a lens in the optical axial direction, which is used in a power focusing apparatus, a power zooming apparatus or the like that controls the focus or the angle of view of a camera lens by means of the driving force of a motor.

2. Description of the Related Art

There are various types of conventional power focusing apparatus and power zooming apparatus which drive a motor in accordance with the amount of operation of a manually operatable operation member and the operational direction thereof, and drive a lens in the optical axial direction by means of the driving force of the motor. In the view point of manual operation of the operation member, these apparatuses are classified into a type having an operation member constituted by a press-button switch as disclosed in the Japanese Patent Disclosure (KOKAI) No. 51-13236, and a type having an operation member constituted by a rotational member such as a focus ring provided around a lens body or the like as disclosed in the Japanese Patent Disclosure (KOKAI) Nos. 63-89823 to 63-89826. Since the operation member need not be mechanically coupled to the lens driving mechanism in those apparatuses, the operation member may be located on the camera body instead of on the lens body.

Suppose that, at a time of adjusting the focus, a photograghing object which should be focused is located slightly closer than the closest photographing distance of a camera lens. With the use of a conventional camera having a mechanical focus adjusting mechanism, a focusing ring is pressed against a closest end stopper while the focusing ring is being rotated so that it cannot be further rotated. This permits a photographer to recognize that the lens has been pressed against the closest end. In a case of a power focusing apparatus, by way of contrast, the operation member and lens driving mechanism are disposed independent from each other, not mechanically coupled together, and the operation member can be operated in endless manner. If the lens is pressed against the closest end and stopped there, therefore, the operation member would not be pressed against anywhere, nor would it be stopped at all. Accordingly, a photographer who is looking through the finder is likely to continue the power-focusing operation without being aware of the lens' pressing against the closest end. The photographer may become aware of this event after continuing this operation a little while. This may make the photographer to feel very inconvenient and to lose a good shutter chance.

Similar inconvenience would certainly occur when a power zooming apparatus is used. For instance, if the photographer continues a zooming operation in order to zoom up a photographing object, the angle of view may not change since the zoom lens is pressed against the long focal distance end. An example of the conventional power zooming apparatus displays the driving direction of a zoom motor within the finder while the motor is being driven (as disclosed in the Japanese Patent Disclosure (KOKAI) No. 51-13236). In this apparatus, even if the lens is pressed against the stopper, the display is kept ON as long as the driving instruction continues, and the above problem will not be overcome.

SUMMARY OF THE INVENTION

Accordingly, it is an object of the present invention to provide an apparatus for driving a lens by means of a motor, which apparatus can ensure prompt focusing and zooming without putting a photographer to great inconvenience.

A lens driving apparatus according to the present invention comprises a manually operatable operation member for instructing driving of a lens, an operation signal generator for detecting the operational direction of the operation member and generating an operational direction signal, a motor for driving the lens, a lens drive detector for generating a drive pulse signal according to driving of the lens, and a controller for detecting the lens reaching one end of a drivable range based on disappearance of the drive pulse signal, and detecting the lens being pressed against an end stopper, inhibiting driving of the lens in a direction to go over the end stopper and changing a resistive force of the operation member when operated in this direction, in a case where the operational direction signal indicates driving over the end stopper, thereby alarming that the lens is pressed against the end stopper.

BRIEF DESCRIPTION OF THE DRAWINGS

FIG. 4B is a diagram illustrating a part of an ultrasonic motor;

FIG. 8 is a circuit diagram illustrating an ultrasonic motor controller;

FIG. 14 is a diagram illustrating the relation between the values of various flags and on/off of a display and a motor;

FIG. 15 is a diagram illustrating the relation between the count values of a counter PLSCNT and motor speeds;

FIG. 19 is a perspective view of a rotational operation member in the fourth embodiment of the present lens driving apparatus;

FIGS. 20 and 21 are diagrams illustrating the relation between the rotational operation member and a detent;

DETAILED DESCRIPTION OF THE PREFERRED EMBODIMENTS preferred embodiment of a lens driving apparatus of the present invention will now be described with reference to the accompanying drawings. The following description will be given of a power focusing apparatus as this embodiment which adjusts the focus by moving a lens by means of a motor that is driven according to a predetermined operation of an operation member, instead of the conventional manual focusing mechanism which performs focus adjustment by manual operation of a focusing ring of a camera lens. A power focusing apparatus may be applied as auxiliary means for a camera or a replaceable lens with an auto-focus function, but the following description will be given of a case where the power focusing apparatus is applied to a manual focusing camera having not auto-focus function.

Figure 1:
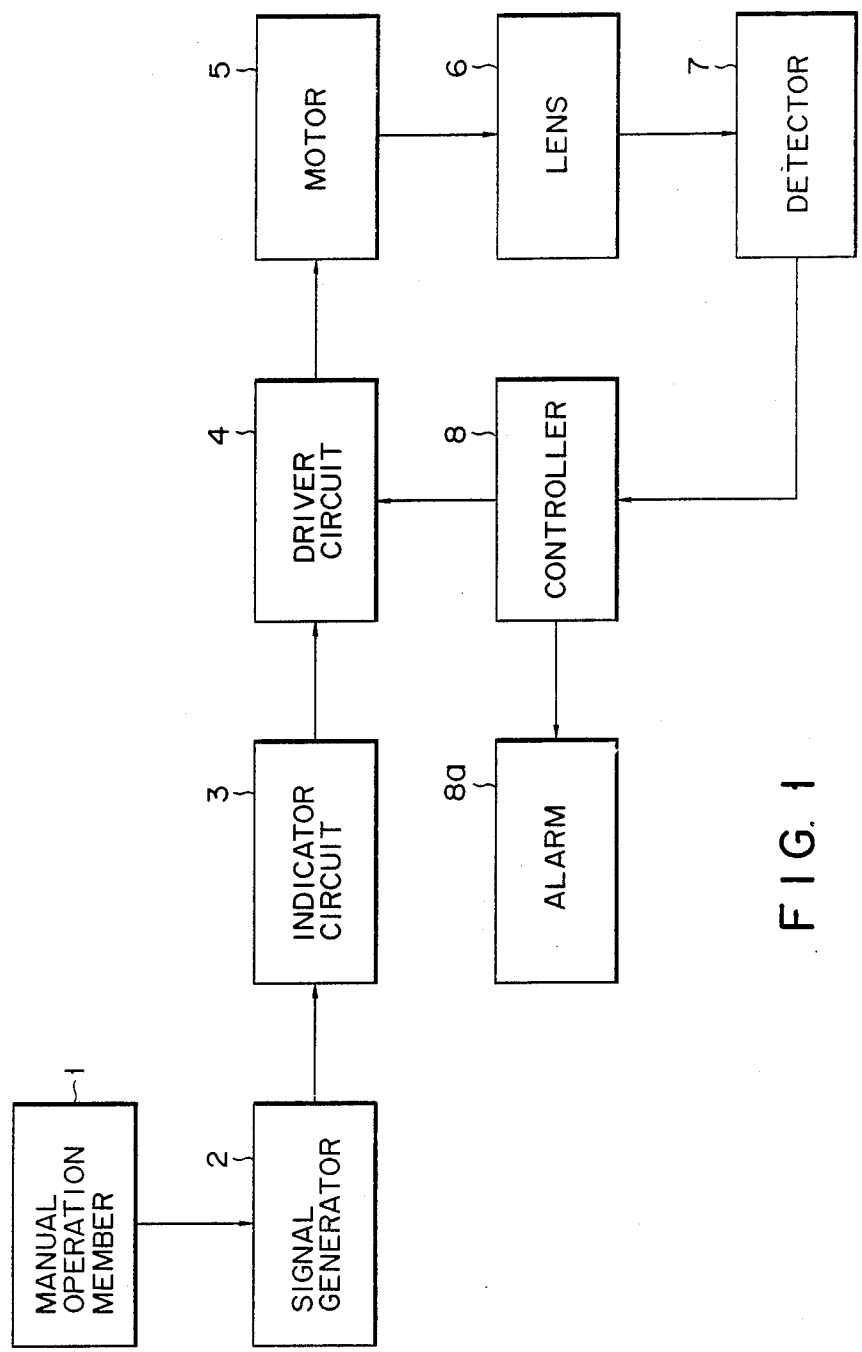
FIG. 1 is a schematic block diagram illustrating the arrangement of the first embodiment of a lens driving apparatus according to the present invention.

FIG. 1 is a schematic block diagram of the first embodiment. When a photographer operates a manual operation member 1, signal generator 2 outputs a manual operation signal according to the operation of the operation member 1 (amount of operation and operational direction). The operation member 1 can be operated in endless manner in two operational directions or the moving directions of a lens 6, i.e., in a direction to change the focus position toward a close range side and in a direction to change the focus position toward a far range side. Upon reception of the manual operation signal, an indicator circuit 3 outputs a signal which indicates at least the driving direction of the lens 6. A driver circuit 4 rotates a motor 5 in accordance with the direction indicating signal from the circuit 3 and drives the lens 6 in the specified direction along the optical axis. The lens 6 moves within a given range between the closest end and the infinity end. Since the manual operation member 1 can be operated endlessly, however, continuing the operation of the member 1 eventually moves the lens 6 to either end of the movable range, thus pressing the lens 6 against a stopper which defines this end. A detector 7 detects this pressed state and supplies the detection result to a controller 8. The controller 8 controls the driver circuit 4 to inhibit the lens 6 from going in a direction over the end and an alarm section 8a to produce an alarm indicating that as the lens is pressed against the end, further driving of the lens in this direction is not possible. Of course, driving the lens 6 in a direction to release the pressing state is permitted.

Accordingly, although an operation member which indicates driving of the lens is driven endlessly in a power focusing apparatus, a photographer can know that the lens has reached the end of the driving range so that he can quickly drive the lens for a focusing purpose without feeling inconvenient.

Figure 2:
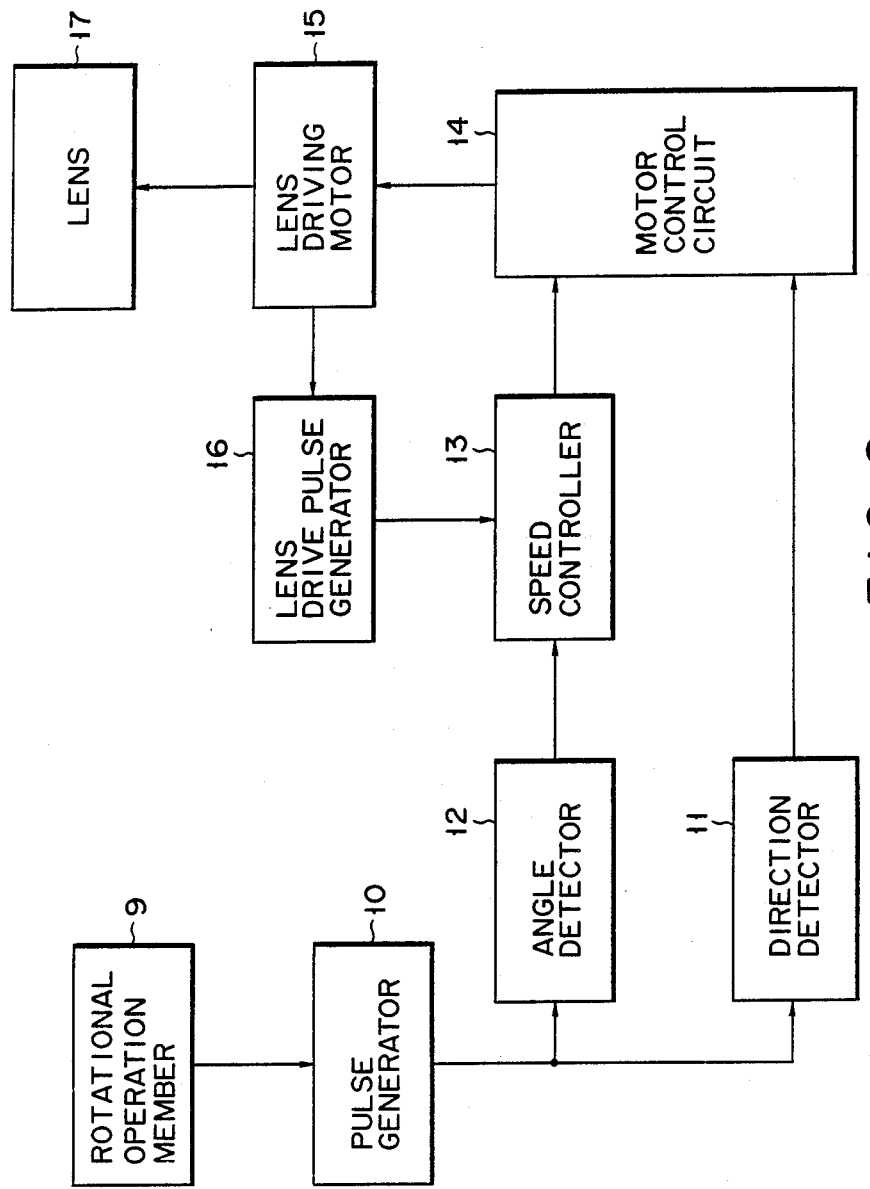
FIG. 2 is a schematic block diagram illustrating the arrangement of the second embodiment of the present lens driving apparatus.
Figure 3:
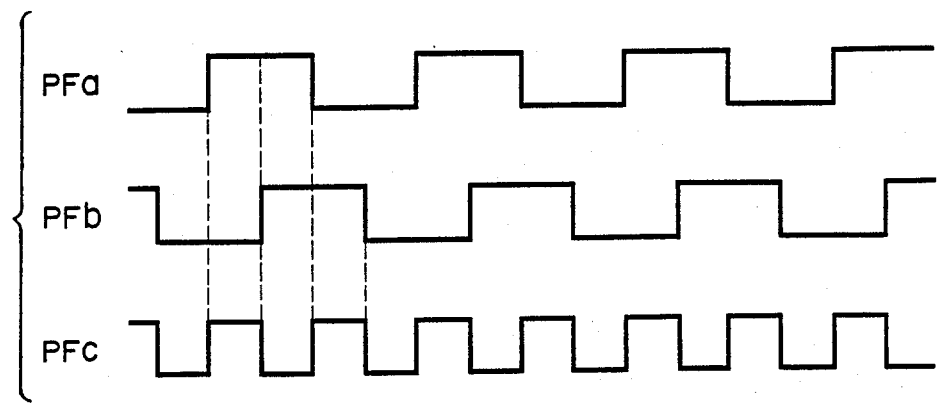
FIG. 3 is a diagram illustrating drive pulse signals generated in accordance with rotation of a rotational operation member.

FIG. 2 is a block diagram illustrating the general arrangement of a power focusing apparatus according to the second embodiment. A rotational operation member 9 is provided on a camera body or a lens body. This operation member 9 can endlessly rotate clockwise or counterclockwise. When the operation member 9 is manually operated, a pulse generator 10 generates two pulse signals PFa and PFb having different phases as shown in FIG. 3, in accordance with the rotation. These two pulse signals are input to an operational direction detector 11 and an amount-of-operation (operation angle) detector 12. The former detector 11 detects the operational direction of the operation member 9 from the phase advancing/delaying relation between the two pulse signals. The latter detector 12 generates a pulse signal PFc representing the amount of operation in high resolution and outputs it as amount-of-operation data. This pulse signal PFc, which rises or falls at the rising or falling of the pulse signal PFa or PFb, is obtained by doubling the signal PFa or PFb. Each of the pulse signals PFa and PFb may be used as it is as the amount-of-operation data.

A lens drive pulse generator 16 generates a lens drive pulse signal in accordance with the rotation of a lens driving motor 15 which moves a camera lens 17 along the optical axis for adjusting focus. This signal is supplied as feedback data to a driving speed controller 13. The amount-of-operation data from the amount-of-operation detector 12 is also input to the controller 13.

The speed controller 13 causes the same counter to count the two input pulse signals. The amount-of-operation data pulse, i.e., the pulse signal PFc, is up-counted, and the feedback data pulse, i.e., the lens drive pulse signal is down-counted. If driving of the lens drive motor 15 is stopped when the count value of this pulse counter reaches 0, therefore, it means that the motor 15 has been driven by an amount corresponding to the amount of operation of the operation member 9. The speed controller 13 sets a driving speed proportional to the count value of the pulse counter and out-puts it as driving speed data. That is, the larger the count value, the faster the driving speed, and the smaller the counter value, the slower the speed. When the count value is 0, the speed is set to 0. In other words, for a large amount of movement, the lens is driven at a high speed, and for a small amount of movement, the lens is driven at a low speed. Actually, at the beginning of the movement, a high speed is set and the driving speed is gradually reduced as the lens approaches the target position. The speed finally becomes 0 and the lens stops at this position.

The driving speed data output from the speed controller 13 and the operational direction from the direction detector 11 are input to the motor control circuit 14, which in turn controls the lens driving motor 15 based on the received data.

Figure 4A:
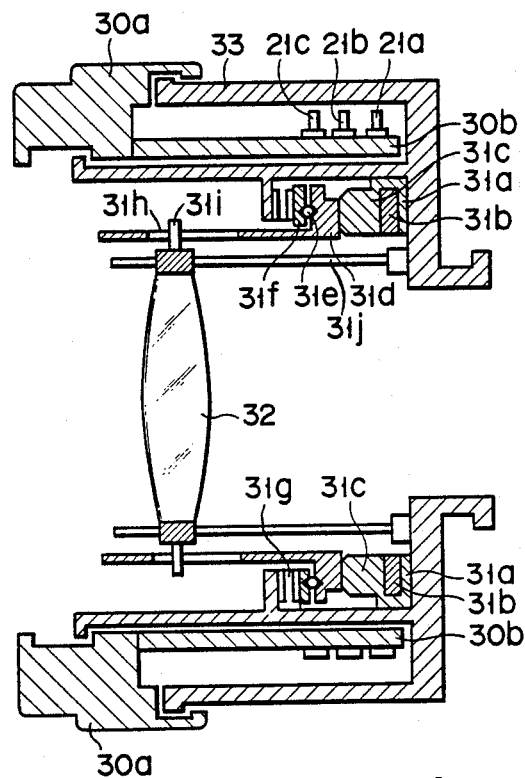
FIG. 4A is a diagram exemplifying the arrangements of the rotational operation member and a pulse generator.
Figure 5:
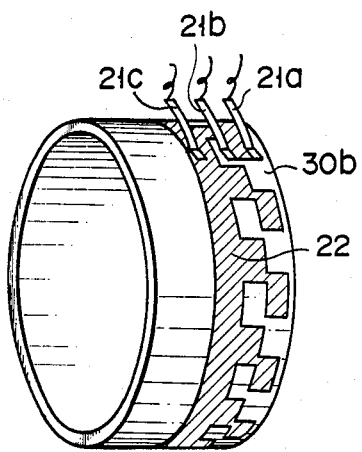
FIG. 5 is a perspective view of the rotational operation member.

FIG. 4A exemplifies the rotational operation member 9 and pulse generator 10 in the second embodiment. The following case where the operation member 9 is provided on the lens body. The operation member 9 comprises a cylindrical operation member 30a provided at part of a lens body 33 (at the front end in this example)

in endlessly rotatable manner, and a rotational cylinder 30b integrated with the member 30a and disposed inside the lens body 33. A conductive pattern 22 shaped as shown in FIG. 5 is stuck on the outer surface of the rotational cylinder 30b. Contact pieces 21a to 21c, which are made of a conductor and each have one end secured to the lens body 33 (not shown in FIG. 5), are pressed against the pattern 22. The contact pieces 21a and 21b are rendered conductive or non-conductive with the contact piece 21c through the conductive pattern 22 by the rotation of the rational cylinder 30b. The shape of the conductive pattern 22 is determined in such a way that there is a 90° phase difference between the timings at which the contact pieces 21a and 21b are rendered conductive with the contact piece 21c. This conduction can therefore be electrically detected, and the operational direction of the rotational operation member 30a can be detected from which one of the phases of the two pulse signals PFa and PFb from the pieces 21a and 21b advances. An amount-of-operation signal, which is the pulse signal PFa or PFb doubled, can be acquired by generating pulses at the rising and falling of a pulse which is generated by rendering the contact piece 21a conductive or non-conductive with the contact piece 21c. The power focusing apparatus according to this embodiment is designed in such a manner as to determine the driving direction and the amount of driving of an ultrasonic motor 31a to 31g disposed in the lens body, based on the data of the operational direction and the amount of operation, and to move a focus adjusting lens 32 (other lenses being omitted in FIG. 4) along the optical axis. This lens 32 moves within a predetermined moving range 31h.

FIG. 4B illustrates a part of the ultrasonic motor. When a piezoelectric element 31b is electrically conducted, a vibration ring 31c is vibrated to generate a progressive wave along the ring 31c. A rotor 31d which is pressed against the ring 31c is rotated in accordance with a rotation of the ring 31c. The lens 32 is guided by a guide rod 31j in an axial direction so that the rotation movement of the rotor 31d is converted into a linear movement of the lens 32 through a roller 31i and a cam groove 31h. The lens 32 is movable in the range defined by the groove 31h.

Figure 6:
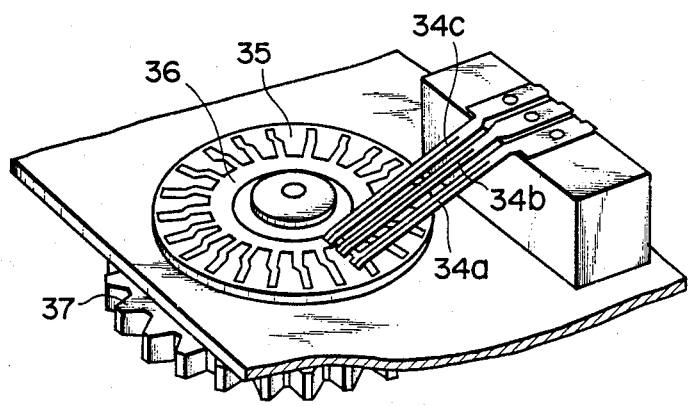
FIG. 6 is a diagram illustrating different arrangements of the rotational operation member and pulse generator.

FIG. 6 illustrates another example of each of the rotational operation member 9 and pulse generator 10. The following description will be given of a case where the operation member 9 and pulse generator 10 are provided on the camera body. When rotational operation member 37 provided outside the camera body is rotated, a rotational plate 35 provided inside the camera body rotates interlockingly. The rotation of the plate 35 causes contact pieces 34a and 34b to become conductive or non-conductive with a contact piece 34c with a phase difference of 90° through a conductive pattern 36 stuck on the plate 35. The lens driving motor is controlled in the same manner as described in the previously-described case where the operation member and pulse generator are provided on the lens body.

As described above, the operation member 9 and pulse generator 10 have only to be provided on either the lens body or camera body, and the pulse generator 10 is constituted by an encoder switch. In the following description, the rotational operation member 9 and pulse generator 10 are provided on the lens body.

Figure 7:
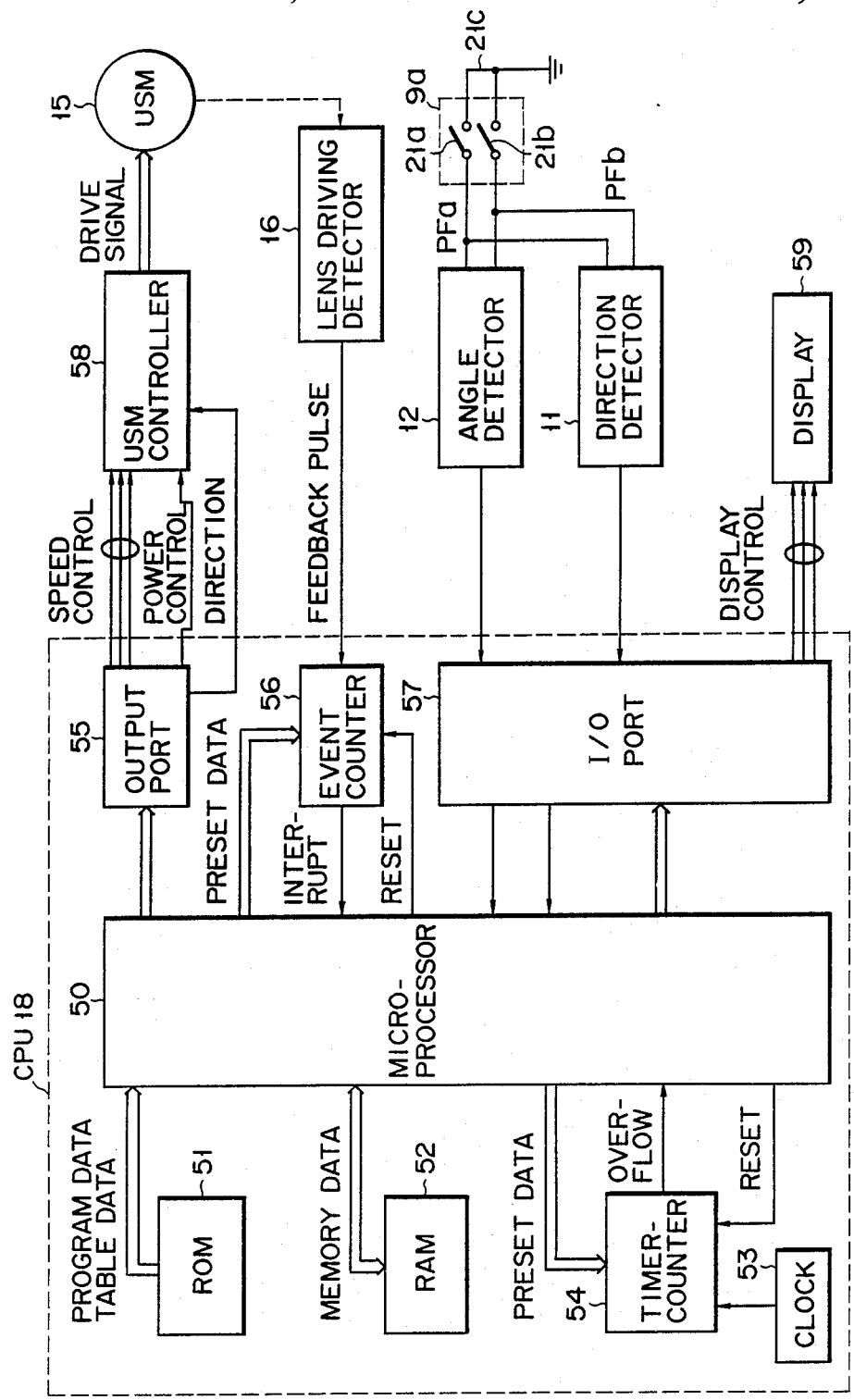
FIG. 7 is a detailed block diagram illustrating the circuit arrangement of the second embodiment.

Referring now to FIGS. 7 and 8, a practical circuit arrangement of the second embodiment will be described. FIG. 7 is a general circuit block diagram of the second embodiment in which the lens driving motor 15 is constituted by an ultrasonic motor (USM). A pulse generator 10 having the contact pieces 21a to 21c and is rendered on/off in accordance with the amount of operation of the operation member 9. Signals from the pulse generator 10 are input as the two-phase pulse signals PFa and PFb (see FIG. 3) to the amount-of-operation detector 12 and the direction detector 11, which in turn a PF encoder amount-of-operation signal PFc (representing the amount of operation of the rotational operation member 30a) and a PF encoder direction signal (representing the operational direction of the member 30a), respectively. The former signal changes its status when the status of the two-phase pulse signal PFa or PFb is changed. The PF encoder direction signal has an "H" (high) level when the operational direction of the operation member 30a is clockwise (CW) and has an "L" (low) level when the direction is counterclockwise (CCW). The PF encoder amount-of-operation signal and PF encoder direction signal are input to a CPU 18.

The CPU 18 supplies a speed control signal and a driving direction signal (indicating CW when "H" and CCW when "L") to an ultrasonic motor (USM) controller 58. The former signal is for setting the rotational speed of the ultrasonic motor 15, and the latter signal is for setting the driving direction. The speed control signal is transferred as 8-bit serial data so that it is possible to set 256 types of speed data from 0 to 255. The USM controller 58 supplies a drive signal to the motor 15 so that the speed becomes maximum when the speed data is 255 and it is the lowest when the speed data is 0 (i.e., the motor is stopped). The amount of driving of the motor 15 is detected by the lens driving detector 16, and the amount of lens movement is supplied as a feedback signal (pulse signal) to the CPU 18. A display 59, provided in the finder of the camera, informs a photographer of the lens pressing the driving end (closest end or infinity end) during the driving of the lens.

As indicated by the broken block in FIG. 7, the CPU 18 for controlling power focus comprises a microprocessor 50 for performing computations and control, a ROM 51 for storing a program and a data table, a RAM 52 for temporary storage of data, a timer counter 54 for counting the time, a clock pulse generator 53 for supplying a clock to the timer counter 54, an output port 55 for outputting control signals to the USM controller 58, an external event counter 56 for counting pulses supplied externally, and an input/output port 57 for controlling an interface with other external units. The timer counter 54, providing a timer function in the CPU 18, counts clock pulses generated every 1 μsec from the clock pulse generator 53, and outputs a timer overflow signal to the microprocessor 50 when the count value coincides with timer count preset data set by the microprocessor 50. The event counter 56 counts feedback pulses (representing the amount of lens movement) from the lens driving detector 16, and outputs a motor pulse interrupt signal to the microprocessor 50 when the count value coincides with amount-of-lens-movement preset data set by the microprocessor 50.

FIG. 8 is a detailed circuit diagram of the USM controller 58. The speed control signal, constituted by 8-bit serial data set by the CPU 18, is converted into parallel data by a serial/parallel (S/P) converter 92. This parallel data is then converted into an analog voltage by a D/A converter 61 and is supplied to one input terminal of a differential amplifier 62. The rotational speed of the motor 15 detected by a frequency encoder 94 is input as an analog voltage to the other input terminal of the differential amplifier 62 through a freguency/voltage (F/V) converter 60. The differential amplifier 62 sends a difference signal representing the difference between the two inputs, i.e., the set speed and actual driving speed, to a comparator 64. The comparator 64 compares this difference signal as a judging level with the output of a triangular wave generator 63 and provides a pulse width modulation (PWM) output. This PWM output signal renders a transistor 65 on or off. Power supplied through this transistor 65 from a power source 66 passes through a smoothing circuit, comprising a choke coil 67, a capacitor 69 and a diode 68, and is applied to transformers 77 and 78 as a voltage proportional to the on/off ratio of the transistor 65. The transformers 77 and 78, which increase the voltage from the power source 66 to a level needed by the motor 15, are controlled by a pre-driver 72 and transistors 73 to 76.

The pre-driver 72 distributes the pulse from a voltage-controlled oscillator 70 to the transistors 73 to 76 in such a way that a 90° phase-shifted AC voltage is generated, and inverts the phase relation in accordance with a direction specifying signal CW/$\overline{CCW}$ from the CPU 18. When 90° phase-shifted AC voltage increased by the transformers 77 and 78 is supplied to electrodes A and B of the motor 15 by a resonance frequency, the motor 15 rotates with this resonance frequency. The resonance status of the motor 15 is monitored by an electrode C and is supplied to a frequency tracking circuit 71. The circuit 71 controls the oscillation frequency of the voltage-controlled oscillator 70 in such a way that the oscillation frequency coincides with the resonance frequency. In the above manner, the motor 15 rotates at a speed corresponding to the speed control signal through a feedback loop.

Figure 9A:
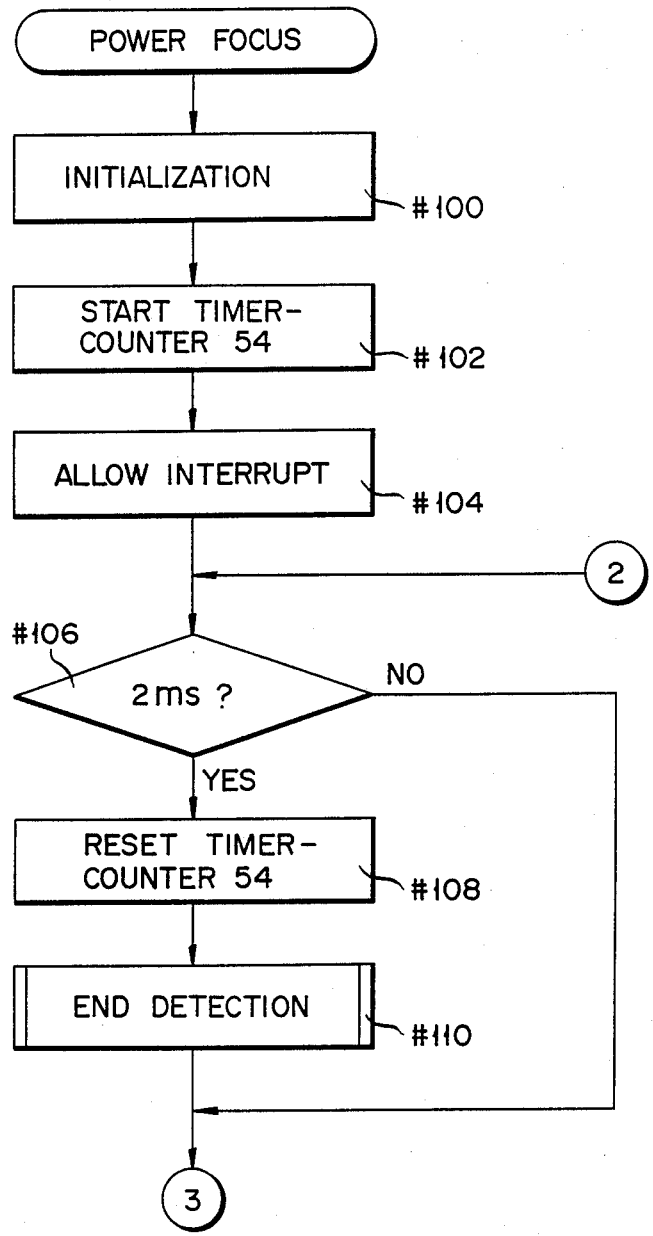
FIGS. 9A and 9B are a flowchart illustrating a power focusing operation according to the second embodiment.
Figure 9B:
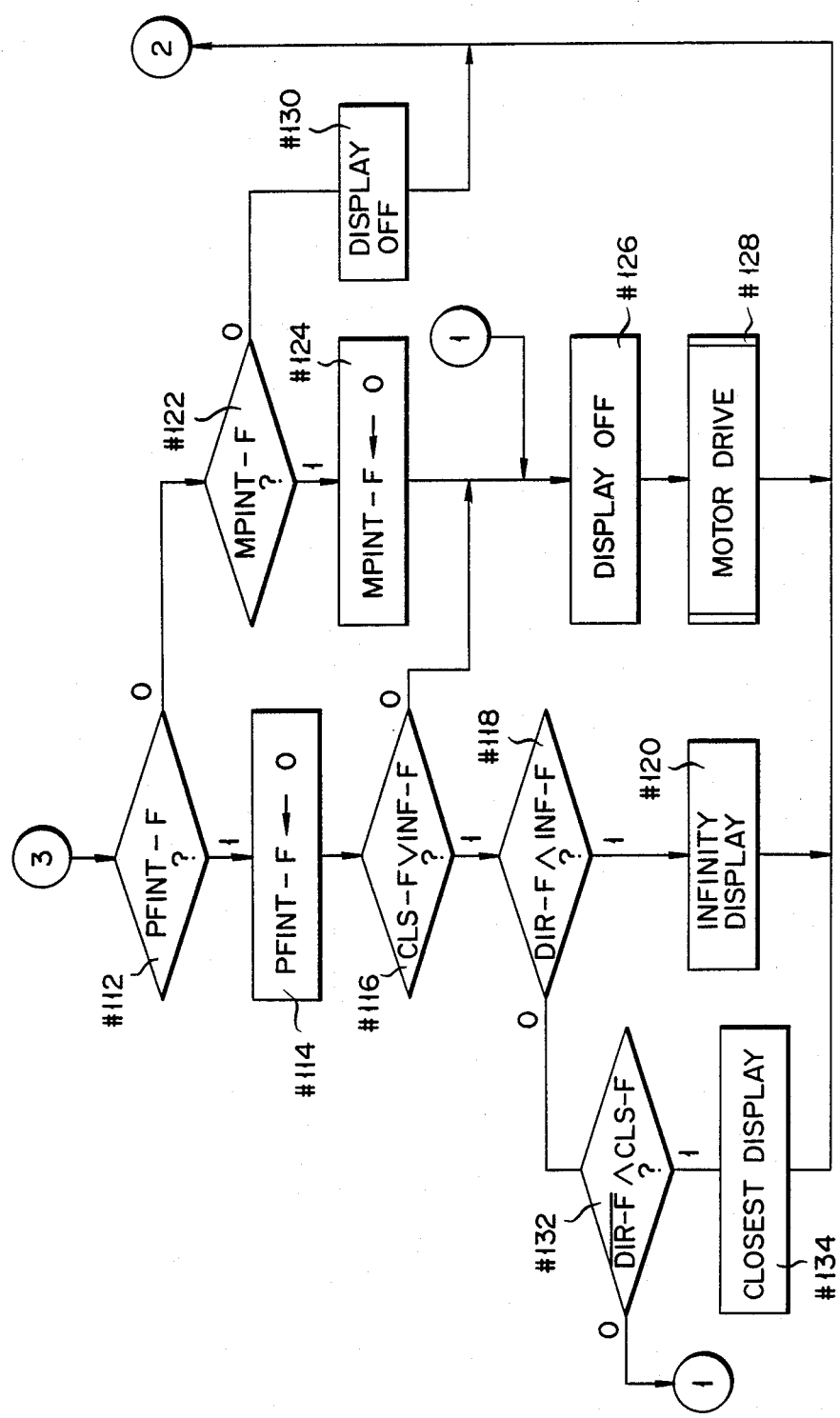

The operation of thus arranged second embodiment will now be described referring to the flowcharts shown in FIGS. 9A through 13. FIG. 9A and 9B are a flowchart illustrating the flow of the operation of the microprocessor 50 in a "Power Focus" routine. This routine starts when a power focus mode is set or power is given. In the first step #100, initialization is executed, i.e., the flags and counters are cleared and the input/output ports are initialized. In step #102 the timer counter 54, which generates the overflow signal every 2 ms, starts functioning. In step #104 interruption is allowed, thus starting the power focusing operation.

In this embodiment, there are two interruptions: the first one is a "PF Encoder Interruption" generated by the PF encoder amount-of-operation signal output by rotating the rotational operation member 30a, and the second one is a "Feedback Interruption" generated by the feedback signal output by rotating the motor 15.

In step #106 it is determined whether or not 2 ms has elapsed from the start of the function of the timer counter 54 and the overflow signal has been produced. If 2 ms has elapsed, the timer counter 54 is reset in step #108 and a subroutine "End Detection" is executed in step #110. If 2 ms has not elapsed, step #112 is executed without resetting the timer counter 54 or executing the subroutine "End Detection."

Figure 10:
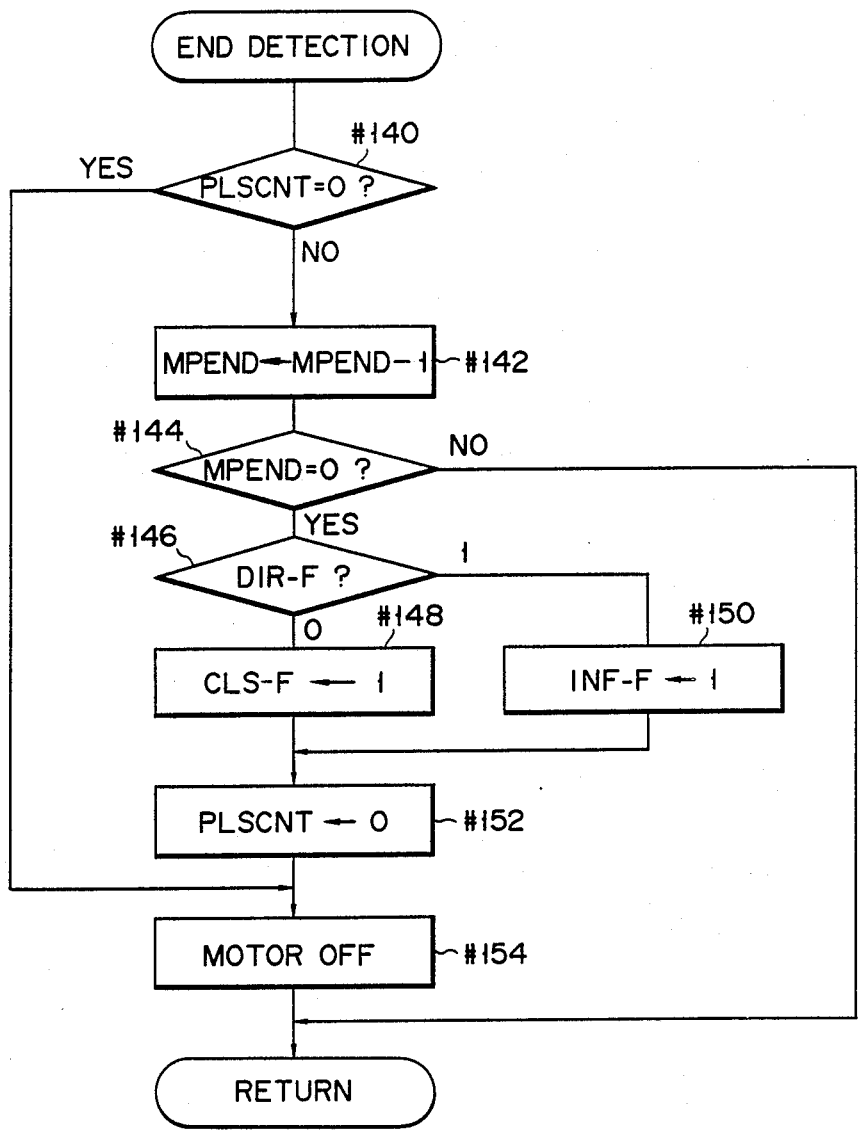
FIG. 10 is a flowchart for a subroutine "End Detection"

FIG. 10 illustrates a flowchart for the subroutine "End Detection" executed every 2 ms. In step #140 it is determined whether or not the value of a counter PLSCNT is 0. When PLSCNT=0, it is considered that the operation member 30a is not operated or the lens has reached the driving end stopper even if the member 30a is operated. In step #154, therefore, the motor 15 is turned off and the flow returns to the original routine. When PLSCNT≠0, which means that the motor is to be driven, it is determined whether or not the lens is pressed against the driving end stopper. Accordingly, in the next step #142, the value of a counter MPEND, in which 25 is set every time the "Feedback Interruption" occurs, is decremented by 1. The value of the counter MPEND is decremented every 2 ms unless the "Feedback Interruption" occurs, and it becomes 0 upon elapse of 50 ms (=2 ms×25). In other words, if the lens 16 is not moved for 50 ms, it can be considered that the lens is pressed against the driving end stopper. In step #144 it is determined whether or not the lens is pressed against the driving end stopper by checking if MPEND=0. If MPEND≠0, which means the lens is not pressed against the driving end stopper, the flow promptly returns to the original routine. If MPEND=0, which indicates that the lens is pressed against the driving end stopper, the value of a motor direction control flag DIR-F indicating the driving direction of the motor 15 is checked in order to find if this end is the closest end or infinity end. If the value of this flag is 0, 1 is set in a closest end flag CLS-F in step #148. If the value of the flag DIR-F is 1, 1 is set in an infinity end flag INF-F in step #150. Then, the counter PLSCNT is set to 0 in step #152 and the motor 15 is turned OFF in step #154. The flow then returns to the original routine. In the above manner, it is determined whether or not the lens is pressed against the driving end stopper in accordance with whether or not the value of the counter MPEND is 0.

In the "Power Focus" routine in FIG. 9B, it is determined whether the lens is pressed against the closest end stopper or infinity end stopper after execution of the subroutine "End Detection". First, the value of a flag PFINT-F indicating the type of interruption is checked in step #112. If the value of this flag PFINT-F is 1, which means that the "PF Encoder Interruption" has occurred by the rotation of the operation member 30a, 0 is set in the flag PFINT-F in step #114. In step #116 a logical sum (OR) of the values of the flags CLS-F and INF-F is checked. If the logical sum of these flags is 1, which means that the lens is pressed against the closest end stopper or infinity end stopper, a logical product (AND) of the flags DIR-F and INF-F is checked in step #118. If this logical product is 1, which means that the lens has reached the infinity end stopper and an instruction is given to further drive the lens in the infinity direction, an infinity display is turned on in step #120 and the flow then returns to step #106.

If the logical product of the flags DIR-F and INF-F is 0 in step #118, which means that the lens has reached the closest end stopper, a logical product of the flags DIR-F and CLS-F is checked in step #132. If the logical product of the flags DIR-F and CLS-F is 1, which means that the lens has reached the closest end stopper and an instruction is given to further drive the lens in the closing direction, a closest display is turned on in step #134 and the flow then returns to step #106.

If the logical product of the flags DIR-F and CLS-F is 0 in step #132, it means that the lens has reached the closest end stopper but no instruction is given to further drive the lens in the closing direction, or the lens has reached the infinity end stopper but no instruction is given to further drive the lens in the infinity direction. In this case, the display (closest display or infinity display) is turned off in step #126 and the flow returns to step #106 after executing the subroutine "Motor Drive" in step #128.

If the logical sum of the flags CLS-F and INF-F is 0 in step #116, which means that the lens has not reached the end, the display is turned OFF in step #126 and the flow returns to step #106 after execution of the subroutine "Motor Drive" in step #128.

If the value of the flag PFINT-F is 0 in step #112, which means that the "PF Encoder Interruption" has not occurred, the value of a flag MPINT-F indicating occurrence of the "Feedback Interruption" is checked in step #122. If the value of the flag MPINT-F is 1, which indicates the occurrence of the "Feedback Interruption," 0 is set in this flag in step #124 and the flow returns to step #106 after the display is turned off in step #126 and the subroutine "Motor Drive" is executed in step #128. If the value of the flag MPINT-f is 0, which indicates that no interruption has occurred, the display is turned off in step #130 before the flow returns to step #106.

Figure 16:
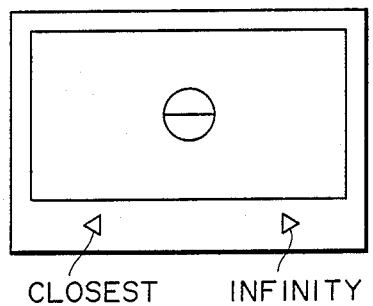
FIG. 16 is a diagram exemplifying the display of an alarm of a lens being pressed.

The steps following step #112 are for determining whether or not the motor should be driven and whether the display should be turned on or off in accordance with the levels of the flags PFINT-F, MPINT-F, CLS-F, INF-F and DIR-F. The branching destination steps associated with the determination results are illustrated in FIG. 14. As should be clear from FIG. 14, the flow branches to the subroutine "Motor Drive" (step #128) only when either the interruption flag PFINT-F or MPINT-F is 1. Even with the flag PFINT-F being 1, however, if the lens has reached the end and an instruction to further drive the lens in a direction to press the lens against the end stopper, either the closest display or infinity display is turned on in the finder and the motor is not driven. The closest display and infinity display are constituted by LEDs or the like provided at the bottom of the field of view in the finder, as shown in FIG. 16.

Figure 11:
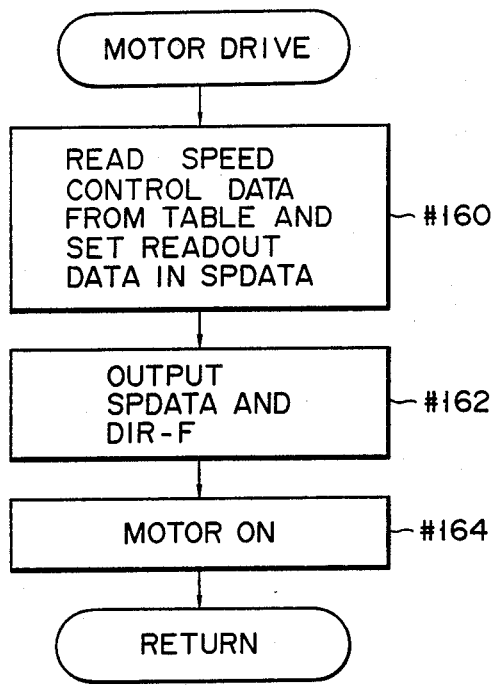
FIG. 11 is a flowchart for a subroutine "Motor Drive"

FIG. 11 is a flowchart for the subroutine "Motor Drive". In step #160, speed data obtained from the count value of the counter PLSCNT referring to a speed control data table is set in a register SPDATA. The values of the register SPDATA and flag DIR-F are output to the USM controller 58 in step #162. The motor is turned ON in step #164 and the flow returns to the original routine. In other words, the speed is controlled in accordance with the value of the counter PLSCNT and the rotational direction is controlled in accordance with the value of the flag DIR-F. Table 1 below shows the speed control data table. FIG. 15 illustrates the relation between the value of the counter PLSCNT and the value of the register SPDATA.

TABLE 1

| PLSCNT | Speed Control Data |
|---|---|
| 0 | 0 |
| 1-5 | 25 |
| 6-10 | 50 |
| 11-15 | 75 |
| 16-20 | 100 |
| 21-25 | 125 |
| 26-30 | 150 |
| 31-35 | 175 |
| 36-40 | 200 |
| 41-45 | 225 |
| 46-50 | 250 |
| 51- | 255 |

There are 256 values of the speed control data, from 0 to 255, available. In view of the response characteristic of the motor and the human sensitivity, however, such a highly accurate control is not required, and 12 different sets each varying by the scale of 25 from the adjacent set as shown in the Table 1 is sufficient for the focus adjustment. The relation between the value of the register SPDATA and the rotational speed of the motor is determined in such a way that the motor is stopped when SPDATA=0 and it rotates at the maximum speed when SPDATA=255. This relation is expressed by the following equation:

$$\text{Rotational Speed} = a \times \text{SPDATA} \ldots \quad (1)$$

where a is a constant determined by the control circuit.

Figure 12:
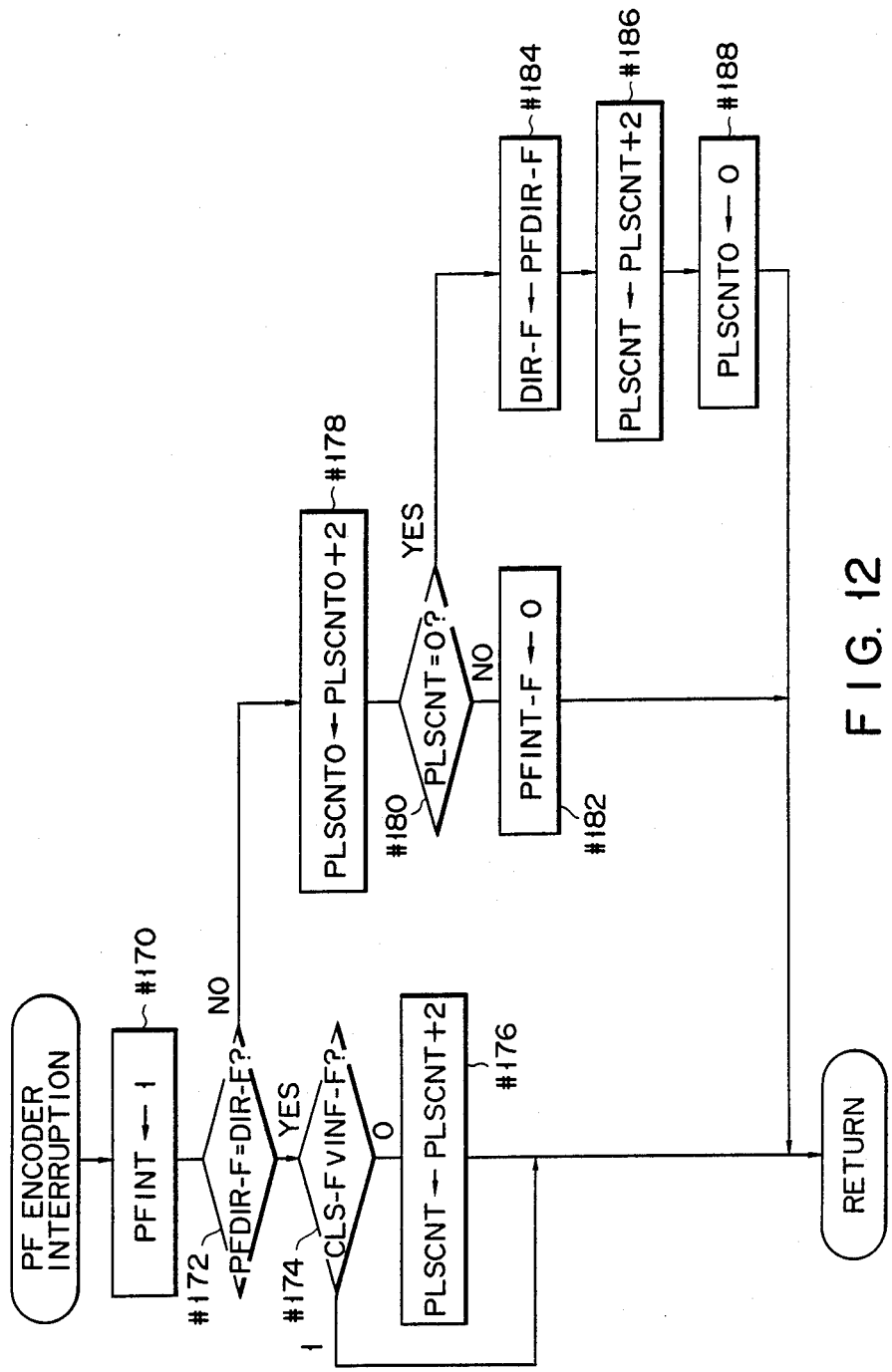
FIG. 12 is a flowchart for a subroutine "PF Encoder Interruption"

FIG. 12 is a flowchart for the subroutine "PF Encoder Interruption". Assuming that a photographer has operated the operation member 30a and the subroutine "PF Encoder Interruption" has occurred, the flag PFINT-F indicating the occurrence of this interruption is set to 1 in step #170. In the subsequent step #172 it is determined whether or not the value of the flag PFDIR-F equals the value of the flag DIR-F. The Flag PFDIR-F is 1 when the operational direction of the operation member 30a is clockwise (CW) and 0 when it is counterclockwise (CCW), while the flag DIR-F is 1 when the motor driving direction is in the infinity direction and is 0 when this direction is in the closing direction. If the values of the flags PFDIR-F and DIR-F equal to each other, the operational direction of the operation member 30a is the same as the rotational direction of the motor 15 and the motor should be further driven in that direction. In step #174, the value of the logical sum of the flags CLS-F and INF-F is checked. If this logical sum is 0, which indicates that the lens has not reached the closest end or the infinity end, the value of the counter PLSCNT is incremented by a given number, e.g., 2, in step #176 before returning to the original routine. If the logical sum of the flags CLS-F and INF-F is 1, which indicates that the lens has reached the closest end or the infinity end, the flow promptly returns to the original routine.

If the values of the flags PFDIR-F and DIR-F are not equal to each other in step #172, for example, when the rotational direction of the operation member 30a is abruptly reversed by a photographer, the value of the counter PLSCNTO is incremented by a given number, e.g., 2, in step #178 and it is determined whether or not the value of the counter PLSCNT is 0 in step #180. If the value of the counter PLSCNT is not 0, which indicates that the lens has not been driven by the set amount of driving, the lens should be further moved in the direction it has been moving before the rotational direction has been reversed. Therefore, 0 is set in the flag PFINT-F in step #182 to indicate that the "PF Encoder Interruption" has not occurred, then the flow returns to the original routine.

If the value of the counter PLSCNT is 0 in step #180, which indicates that the motor is not presently rotating, the motor should be driven in the direction specified by the flag PFDIR-F so that the value of this flag is set in the flag DIR-F in step #184. The value of the counter PLSCNT is incremented by 2 in step #186, 0 is set in the value of the counter PLSCNTO in step #188, then the flow returns to the original routine.

Figure 13:
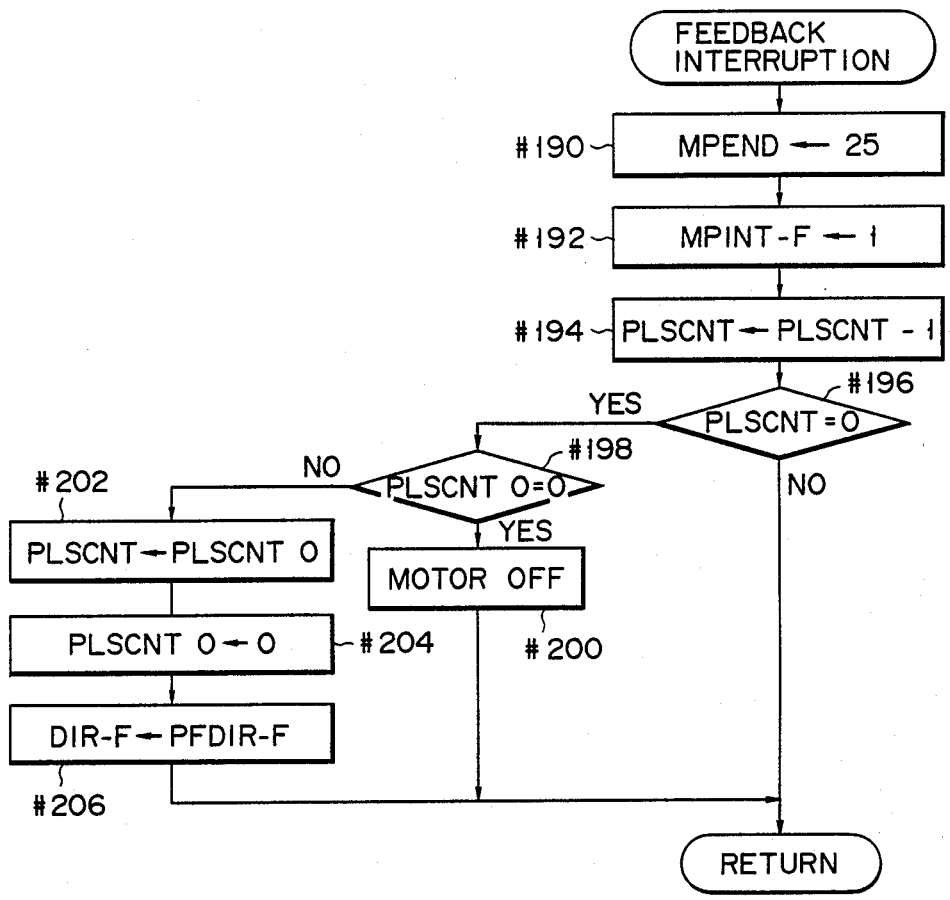
FIG. 13 is a flowchart for a subroutine "Feedback Interruption"

FIG. 13 is a flowchart for the subroutine "Feedback Interruption". When the feedback signal is output by the rotation of the motor 15, 25 is set to the counter MPEND for detecting the lens reaching the closest end or the infinity end. As described in the foregoing description of the subroutine "End Detection" executed every 2 ms, the counter MPEND is down-counted. When the value of this counter becomes 0, it can be considered that the lens has reached the end, and this value is used to set 1 to either the closest end flag CLS-F or infinity end flag INF-F based on the value of the flag DIR-F. In step #192, 1 is set in the flag MPINT-F indicating that the "Feedback Interruption" has occurred and the value of the counter PLSCNT is decremented by 1 in step #194. In step #196 it is determined whether or not the decrementing result is 0. If the result is not 0, the flow promptly returns to the original routine. If the decrementing result is 0, it is determined in step #198 whether or not the value of the counter PLSCNT0, which is counted up only when the value of the flag PFDIR-F differs from that of the flag DIR-F, is 0. If the value of the counter PLSCNT0 is 0, which means that it is unnecessary to drive the motor in the reverse direction, the motor is turned off in step #200 before the flow returns to the original routine.

If the value of the counter PLSCNT0 is not 0 in step #198, which means that the motor should be driven in the reverse direction, this counter value is set in the counter PLSCNT in step #202 and the counter PLSCNT0 is cleared (set to 0) in step #204. Then, the value of the flag PFDIR-F is set in the flag DIR-F in step #206 before the flow returns to the original routine.

According to this embodiment, as described above, if an instruction is given to further drive the lens over the driving end while the photographer operates the operation member to perform the power focusing operation although the lens has already been pressed against that end, an alarm is given on the display in the finder that the lens being pressed against the closest end or infinity end stopper cannot be driven further. This can therefore permit the prompt driving of the lens to a given position without making the photographer feel inconvenient.

The display ma simply indicate that the lens is at the end, instead of indicating the end direction. Although the indicating member for power-focus is a rotational operation member, it may be a push-button type operation member which can separately indicate the driving in the closest end direction and the driving in the infinity end direction. Further, the display in the finder for a pressing alarm may be replaced by an alarm sound generated by a sound generating element such as a PCV. Although the display is on when the lens has reached the end in the embodiment, the display may be turned on during lens driving and turned off when the lens driving is not possible. Furthermore, although the event of the lens reaching the end is detected when a signal for monitoring the lens movement is not received for a predetermined period of time, this event may be detected by providing a switch which is turned on (or off) when the lens reaches the end stopper.

Figure 17:
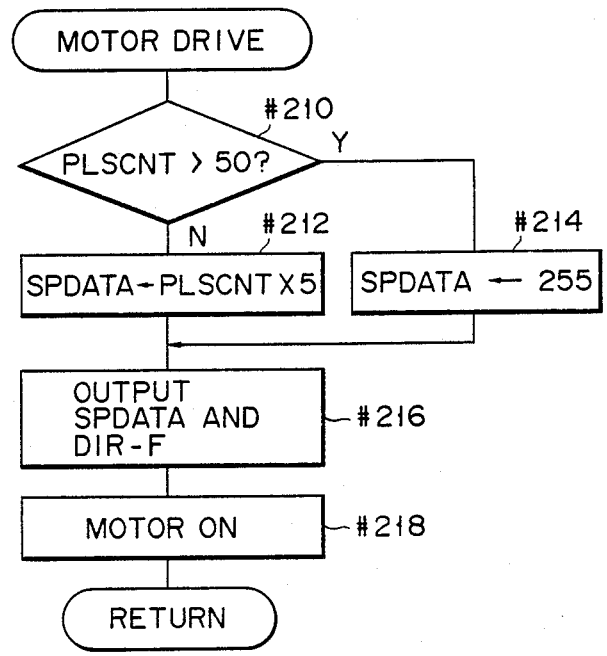
FIG. 17 is a flowchart for a subroutine "Motor Drive" according to a modification of the second embodiment.

According to this embodiment, the speed control data is read out from the counter PLSCNT using the table as shown in the Table 1. The speed control data may however be acquired by subjecting the data of the counter PLSCNT to a proper arithmetic operation without using such a table. The flowchart for the subroutine "Motor Driver" of this modification is illustrated in FIG. 17. In step #210 it is determined whether or not the data of the counter PLSCNT is greater than 50. If the data is not greater than 50, the data of the PLSCNT is multiplied by 5 and the result is set in the register SPDATA in step #122. IF the data of the counter PLSCNT is greater than 50, the maximum value 255 is set in the register SPDATA in step #214. In step #216 the values of the register SPDATA and flag DIR-F are output to the USM controller 58. The motor 15 is switched on in step #218 and the flow returns to the original routine. In this case, the SPDATA has a characteristic linearly varying to the maximum value 255 instead of a characteristic varying in steps as shown in FIG. 15.

A description will now be given of the embodiment which gives an alarm to a photographer when the lens reaching the end is detected, by tactual means, not visual means such as a display.

Figure 18:
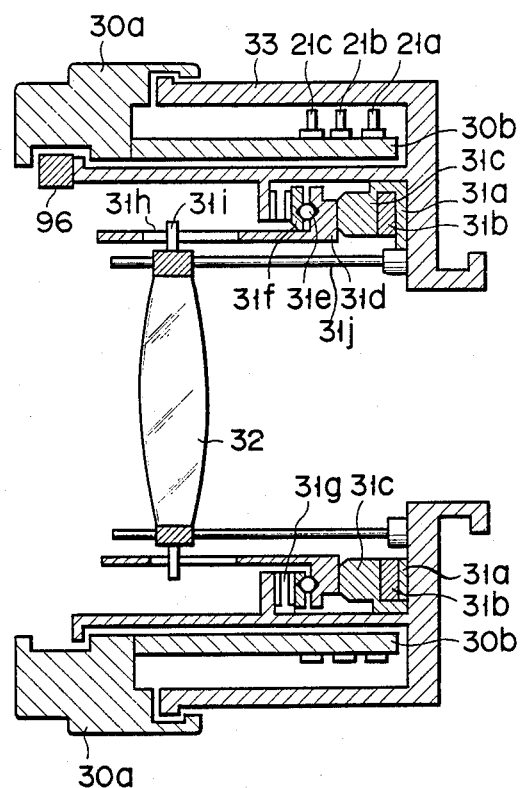
FIG. 18 is a diagram illustrating the arrangements of a rotational operation member and a pulse generator in the third embodiment of the present lens driving apparatus.

FIG. 18 illustrates a rotational operation member and a pulse generator according to the third embodiment. These elements are the same as those of the second embodiment except that an electrostrictive element 96 is secured to that portion of the lens body 33 which faces the rotational cylinder 30a. When the lens is pressed against the driving end, a voltage is applied to the element 96. Consequently, the element 96 is deformed or stretched in the radial direction of the lens body or the optical axial direction, thus pressing the operation member 30a. The load of the operation member 30a is therefore increased by the frictional force with the element 96. In other words, when the photographer operates the operation member 30a until the lens 32 reaches the driving end, the frictional resistance of the operation member 30a is rapidly increased to thereby making the member 30a difficult to rotate, thus informing the photographer that the lens has reached the driving end.

Another example of presenting tactual alarming means is illustrated as the fourth embodiment in which an operation ring is stopped by a ratchet to prevent further rotation of the operation member in the direction the lens is being pressed. FIG. 19 illustrates an rotational member of the fourth embodiment. A first click 100a and a second click 100b are provided at the inner diameter portion of a focusing ring 100; the clicks 100a and 100b are only partially illustrated. The clicks 100a and 100b are ratchet clicks having the opposite inclinations. Bistable magnets 101, 103 are secured to the internal stationary portion in the lens, with a detent 102 being attached to the former magnet 101 and a detent 104 being attached to the latter magnet 103. FIG. 20 illustrates the relation between the bistable magnet 101, the detent 102 and the click 100a as viewed from the direction of the arrow A. FIG. 21 illustrates the relation between the bistable magnet 103, the detent 104 and the click 100b as viewed from the arrow direction A.

The arrangement in FIG. 20 will be described first. It is assumed that the detent 102 is rotated in the arrow direction α by the bistable magnet 101. Since the fore end of the detent 102 is shaped to engage with the click 100a, the focusing ring 100 cannot be rotated in the arrow direction a even when tried. Since the fore end of the detent is shaped to be easily disengaged from the click 100a, if the focusing ring 100 is made to rotate in the arrow direction b, the detent 102 moves in the arrow direction β, thus permitting the rotation of the focusing ring 100.

With the detent 102 being disengaged from the click 100a, since the detent 104 is set free from the click 100b in the state shown in FIG. 21, the focusing ring 100 can freely rotate. At this time, the detent 104 is rotated in the arrow direction δ with respect to the click 103. When the detent 104 is rotated in the arrow direction γ, it is engaged with the click 100b, thus preventing the focusing ring 100 from rotating in the arrow direction b. When the focusing ring 100 is made to rotate in the direction a, on the other hand, the detent 104 shaped to be easily disengageable from the click 100b which rotates in the direction δ, thus permitting the focusing ring 100 to rotate in the direction a.

An encoder pattern 106 is formed on a small diameter portion 100c of the focusing ring 100, with slidable contact pieces 105 contacting the pattern 106. The contact pieces 105 are secured in the internal stationary portion in the camera. Rotating the focusing ring 100 the position of the encoder pattern 106 with respect to the contact pieces 105 changes and predetermined data corresponding to the rotational angle of the focusing ring 100 can be detected.

Figure 22:
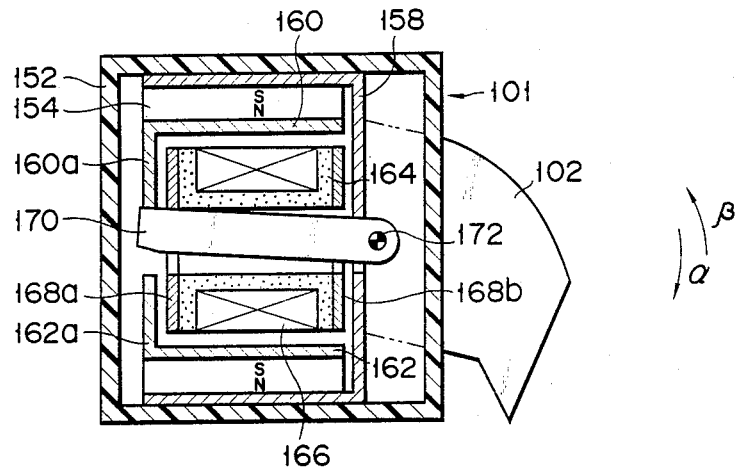
FIG. 22 is a diagram illustrating the structure of a bistable magnet.
Figure 23:
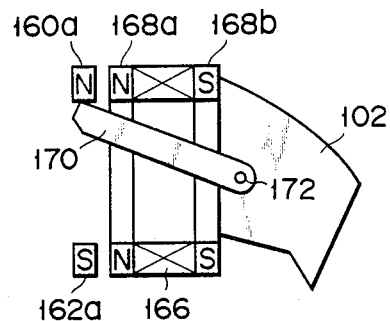
FIGS. 23 through 25 are diagrams illustrating the operation of the bistable magnet.
Figure 24:
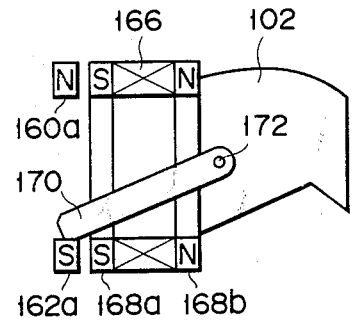
Figure 25:
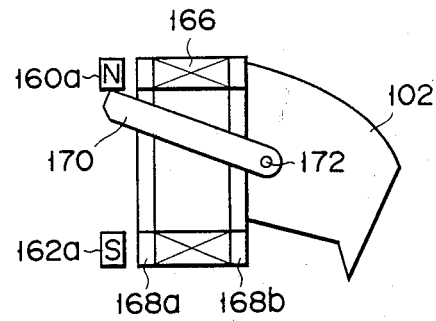

The bistable magnets 103 and 101 are basically the same, so are the detents 104 and 102. Exemplary structures of the bistable magnet 101 and the detent 102 will be described below referring to FIGS. 22 through 25. As shown in FIG. 22, the bistable magnet 101 comprises an outer cover 152, permanent magnets 154 and 156, iron pieces 158, 160a, 162a, 168a and 168b, a coil 166, a bobbin 164, a rotary shaft 172 and an operation rod 170. The detent 102 is secured to the rotary shaft 172. The operation of the bistable magnet 101 will now be explained referring to FIGS. 23 to 25. When a current flows through the coil 166 in a predetermined direction, the iron pieces 168a and 168b are respectively rendered to be an N pole and an S pole, as shown in FIG. 23. Since the S pole of the iron piece 162a and the N pole of the iron piece 168a cancel out each other and the N poles of the iron pieces 160a and 168a amplify their magnetic forces, the operation rod 170 made of iron or the like is attracted to the iron piece 160a. In other words, the detent 102 rotates in the direction α. When conduction of the coil 166 in this state is stopped, the iron pieces 168a, 168b are both demagnetized, as shown in FIG. 25, thus leaving the operation rod 170 attracted to the iron piece 160a. Permitting a current to flow through the coil 166 in the reverse direction sets the iron pieces 168a and 168b to an S pole and an N pole, respectively, as shown in FIG. 24. The pole of the iron piece 160a and the S pole of the ion piece 168a cancel out each other, and the S poles of the iron pieces 162a and 168a mutually increase the magnetic forces. Accordingly, the operation rod 170 is attracted to the iron piece 162a, thus permitting the detent 102 to rotate in the direction β. Even if the current supply to the coil 166 is stopped in this state, the detent 102 is held in this state. That is, the coil 166 needs to be energized only when the position of the detent 102 (rotation in the direction α or β) is changed, and even deenergizing the coil 166 keeps the detent 102 held in tact by the attractive force of the permanent magnet 156.

The general operation will now be described. Assume now that the detents 102 and 104 are rotated in the direction β and δ, respectively, and the focusing ring 100 is rotatable both in the directions a and b. Then, rotating the focusing ring 100 in the direction a causes a focusing lens (not shown) to be moved to the infinity direction by the output of the contact pieces 105. When the focusing lens is moved to the infinity end, the bistable magnet 101 is energized to rotate the detent 102 in the direction α. Accordingly, the focusing ring 100 is not rotatable in the direction a. When the focusing lens reaches the infinity end, therefore, the focuisng ring 100 is prevented from further rotating.

When the focusing ring 100 rotates in the direction b from the above state, the click 100a is disengaged from the detent 102, thus permitting rotation of the ring 100. As a result, a signal is again output from the contact pieces 105. This output signal is detected, and the reverse current is permitted to flow through the bistable magnet 101, thus rotating the detent 102 in the direction β. This can permit the focusing ring 100 to rotate also in the direction b. When the focusing ring 100 rotates in the direction b, the lens is gradually moved to the closest end. When this event is detected, the bistable magnet 103 is energized to rotate the detent 104 in the γ direction for engagement with the click 100b. This engagement inhibits the rotation of the focusing ring 100 in the direction b. If the focusing ring 100 is rotated in the direction a, the detent 104 is disengaged from the click 100b to permit the ring 100 to rotate in the direction a. Consequently, a signal is again output from the contact pieces 105. This output signal is detected, and the reverse current is permitted to flow through the bistable magnet 103, thus rotating the detent 104 in the direction δ. The rotation of the detent 104 permits the focusing ring 100 to freely rotate in the direction a. At this time, since neither the detent 102 nor 104 is engaged with the focusing ring 100, so that the ring 100 can freely rotate in both directions a and b.

The control circuit for the fourth embodiment is substantially the same as the one used in the second embodiment and the display operation has only to be replaced by energization of the bistable magnet. A detailed description of the control circuit will therefore be omitted.

As another example of alarming the lens reaching the end, a piezoelectric element may be provided on that portion of the operation member which is likely to be touched by the photographer's fingers, in such a way that an alarm can be given by vibrating the piezoelectric element. In order to realize this alarm, a step for energizing the piezoelectric element is provided after the step #154 of FIG. 10, the steps #134 and #120 of FIG. 9 are omitted and the step #126 of FIG. 9 is changed to a step for deenergizing the piezoelectric element.

Although the foregoing description has been given with reference to a lens driving apparatus as applied to a power focusing apparatus, the present lens driving apparatus can also be applied to a power zooming apparatus. In this case, the closest end and infinity end in the above-described embodiments need to be simply replaced by the shortest focal length end and the longest focal length end. Alternately, the present lens driving apparatus may naturally be applied to a camera equipped with both the power focusing and power zooming apparatuses. An alarm may be displayed to simply indicate that the lens has reached the end instead of indicating such an event that the lens has reached the end and an instruction is given to further drive the lens in a direction to go beyond the end. In order to realize this display, a step for generating an alarm for 0.1 sec is provided after the step #154 in FIG. 10.

As described above, according to the lens driving apparatus of the present invention, when a photographer gives an instruction to move the lens in a direction to go beyond the driving end even if the lens is pressed against this end, an alarm is given to show that further driving of the lens is not possible by means of a display within the finder, an alarm sound or tactual indication.

Unlike with the use of the conventional power focusing apparatus or power zooming apparatus, if the lens is pressed against the driving end, a photographer can surely detect such an event and avoid the otherwise possible unnecessary continuous operation of the operation member, so that he will not loose a good shutter chance and can perform lens driving smoothly without any inconvenience.

What is claimed is:

1. A lens driving apparatus comprising:
    a manually operable operation member for indicating driving of a lens;
    direction detecting means for detecting an operational direction of said operation member and generating an operational direction signal;
    means for driving the lens;
    drive detecting means for detecting driving of the lens and generating a drive pulse;
    pressing detecting means for detecting that the lens has reached one of ends of a drivable range of the lens based on the drive pulse and detecting the lens being pressed against said one end when the operational direction signal indicates further driving of the lens in a direction to go over said one end;
    means for inhibiting the lens from being driven in said direction toward said one end upon detection of pressing of the lens; and
    alarm means for varying a resistive force of said operation member when operated at a time pressing of the lens is detected, thereby alarming that the lens is pressed against said one end.

2. The apparatus according to claim 1, in which said alarm means includes means for increasing a frictional resistance of said operation member when operated.

3. The apparatus according to claim 2, in which said frictional resistance increasing means includes an electrostrictive element provided between said operation member and a support portion of said operation member and stretchable upon detection of pressing of the lens.

4. The apparatus according to claim 1, in which said alarm means includes one directional stopping means, coupled to said operation member, for inhibiting operation of said operation member in a direction corresponding to said direction toward said one end.

5. The apparatus according to claim 4, in which said one directional stopping means includes first and second ratchet clicks provided on said operation member and having mutually opposite inclinations, a detent provided at a support portion of said operation member, and a bistable magnet for permitting said detent to engage with one of said first and second ratchet clicks which is associated with said operational direction signal, when pressing of the lens is detected.

6. The apparatus according to claim 1, in which said operation member includes a cylindrical member provided on a body of the lens and rotatable around said body.

7. The apparatus according to claim 1, in which said operation member includes a disk-shaped member provided rotatable on a camera body.

8. The apparatus according to claim 1, in which said pressing detecting means includes means for detecting that the lens has reached an end when a generation interval of said drive pulse is greater than a predetermined time.

9. A lens driving apparatus comprising:
    means for generating two encoder pulse signals having mutually different phases through manual operation of a manual operation member;
    motor means for driving a lens;
    direction detecting means for detecting an operational direction of the manual operation member based on the two encoder pulse signals;
    means for generating a drive pulse in accordance with movement of the lens caused by said motor means;
    central processing unit means for receiving outputs of said direction detecting means and said drive pulse generating means, detecting that the lens has reached one of ends of a drivable range of the lens based on disappearance of said drive pulse, inhibiting said motor means to drive the lens, and generating an alarm signal when a direction toward said one end is the same as said operational direction; an
    alarm means for receiving said alarm signal and changing a resistive force of the manual operation member when operated, thereby alarming that the lens is pressed against said one end.

10. The apparatus according to claim 9, in which said alarm means includes an electrostrictive element provided between the manual operation member and a support portion of the manual operation member, said electrostrictive element being stretched upon detection of pressing of the lens to thereby increase friction between the manual operation member and the support portion.

11. The apparatus according to claim 9, in which said alarm means includes one directional stopping means, coupled to the manual operation member, for inhibiting operation of the manual operation member in a direction corresponding to said direction toward said one end.

12. The apparatus according to claim 11, in which said one directional stopping means includes first and second ratchet clicks provided on the manual operation member and having mutually opposite inclinations, a detent provided at a support portion of the manual operation member, and a bistable magnet for permitting said detent to engage with one of said first and second ratchet clicks which is associated with said operational direction detected by said direction detecting means, when pressing of the lens is detected.

13. The apparatus according to claim 9, in which said central processing unit means detects that the lens has reached said one end when a generation interval of the drive pulse is greater than a predetermined time.

14. A lens driving apparatus comprising:
    a manually operable operation member for indicating a driving direction of a lens;
    means for driving the lens in a direction specified by said operation member;
    means for generating a drive pulse in accordance with driving of the lens;
    means for detecting that the lens has reached one of ends of a drivable range of the lens; and
    alarm means for alarming that the lens is pressed against said one end when it is detected that the lens reaching said one end and said operation member indicates driving of the lens in a direction to go over said one end.

15. A lens driving method in a lens apparatus comprising means for generating an operational direction signal according to an operational direction of a manual operation member, means for driving a lens and means for detecting that the lens has reached an end of a drivable range, said method comprising the steps of:
- driving the lens in a direction associated with said operational direction signal;
- determining whether or not the lens has reached an end, continuing driving of the lens when the end is not reached, and stopping driving of the lens when said end is reached; and
- alarming that the lens is pressed against said end when an operational direction signal specifying driving of the lens in a direction to go over said end is generated after said end is reached.

16. A lens driving apparatus comprising:
- a manually operable operation member for indicating driving of a lens;
- direction detecting means for detecting an operational direction of said operation member and generating an operational direction signal;
- means for driving said lens;
- drive detecting means for detecting driving of the lens and generating a drive pulse signal;
- detecting means for detecting that the lens has reached one of ends of a drivable range of the lens based on said drive pulse signal;
- inhibiting means for detecting pressing of the lens against said one end and inhibiting the lens from being driven in a direction toward said end when said operational direction signal indicates said direction toward said end after said detecting means detects that the lens has reached said end; and
- alarm means for alarming pressing of the lens upon detection of said pressing of the lens.

17. The apparatus according to claim 16, in which said alarm means includes display means provided in a finder of a camera.

18. The apparatus according to claim 16, in which said alarm means includes a PCV for generating an alarm sound.

19. The apparatus according to claim 16, in which said operation member includes a disk-shaped member rotatable endlessly.

20. A lens driving apparatus for use in a camera, comprising:
- a motor for driving a lens system for adjusting a focus or an angle of view of a camera lens;
- a rotational operation member for outputting a drive direction signal to indicate a drive direction of the lens system in accordance with a rotational operation;
- means for controlling driving of said motor based on said drive direction signal;
- means for detecting that the lens system has reached one of ends of a movable range of the lens system; and
- alarm means for inhibiting a power supply to said motor and increasing a resistive force of said rotational operation member when operated, in accordance with a detection result of said detecting means, thereby alarming that the lens system has reached said one end.

21. The apparatus according to claim 20, in which said alarm means comprises:
- means for determining whether or not said one end is a first end or a second end and storing a determination result; and
- means for continuing said alarming when said drive direction signal indicates driving toward a direction of said stored end, and stopping said alarming and clearing a stored content of said determining means when said drive direction signal indicates driving toward a direction different from said stored end.

22. A lens driving apparatus for use in a camera, comprising:
- a motor for driving a lens system for adjusting a focus or an angle of view of a camera lens;
- a rotational operation member for outputting a drive direction signal to indicate a drive direction of the lens system in accordance with a rotational operation;
- means for controlling driving of said motor based on said drive direction signal;
- means for detecting that the lens system has reached one of ends of a drivable range of the lens system; and
- means for inhibiting a power supply to said motor and preventing said rotational operation member from being operated in a direction corresponding to said one end.

* * * * *